(12) United States Patent
Harada

(10) Patent No.: US 6,754,069 B2
(45) Date of Patent: Jun. 22, 2004

(54) PORTABLE TERMINAL WEARABLE ON FOREARM

(75) Inventor: Hideki Harada, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/840,832

(22) Filed: Jul. 26, 2001

(65) Prior Publication Data

US 2002/0105778 A1 Aug. 8, 2002

(30) Foreign Application Priority Data

Feb. 7, 2001 (JP) ........................................ 2001-030571

(51) Int. Cl.$^7$ ................................................. G06F 1/20
(52) U.S. Cl. ..................................... 361/681; 361/683
(58) Field of Search ................................. 361/678–686

(56) References Cited

U.S. PATENT DOCUMENTS

| | | | | |
|---|---|---|---|---|
| 5,398,991 A | * | 3/1995 | Smith et al. ............. | 297/88.16 |
| 6,184,804 B1 | * | 2/2001 | Harrison ...................... | 341/22 |
| 6,275,376 B1 | * | 8/2001 | Moon .......................... | 361/683 |
| 6,285,757 B1 | * | 9/2001 | Carroll et al. .............. | 379/433 |

OTHER PUBLICATIONS

SanGiovanni (US 2002/0102946 A1), "ModularTwo–Body Design For Integration Of Mobile Computing Device Features With A Wireless Communication Device" Aug. 1, 2002, US patent application Publication, 6 pages and 7 figures.*

* cited by examiner

Primary Examiner—Darren Schuberg
(74) Attorney, Agent, or Firm—Wenderoth, Lind & Ponack, L.L.P.

(57) ABSTRACT

A portable terminal wearable on a forearm includes a display screen that can be adjusted to be almost perpendicular to a visual axis of a user without interrupting an operation being performed by the hand connected to the forearm, and can be protected from an unexpected external impact. The portable terminal is worn near the wrist of the forearm via a forearm fixing band of a forearm mounting unit. A first rotary mechanism enables an x-axis of the display screen of the display unit to be adjusted, so that the screen is visible. Upon operation of the first rotary mechanism, a hinge case and display unit are turned to a certain angle with respect to the forearm mounting unit. Then, a second rotary mechanism enables a y-axis of the display screen to be adjusted, so that the screen is further visible. Upon operation of the second rotary mechanism, the display unit is turned to a certain angle with respect to the hinge case.

32 Claims, 3 Drawing Sheets

PORTABLE TERMINAL WEARABLE ON FOREARM

FIELD OF THE INVENTION

The present invention relates to a portable terminal wearable on a forearm, such as a portable personal computer having a display unit.

BACKGROUND OF THE INVENTION

A conventional portable terminal wearable on a forearm, such as a portable personal computer, is worn on a wrist or forearm of a user directly via a belt.

The conventional portable terminal wearable on the forearm will be explained with reference to the drawings. FIG. 4 is a perspective outline view of a portable terminal wearable on a forearm. A display unit 41 incorporates a liquid crystal display 42. At a back side of a display screen 42a of a case 43 of the display unit 41, a fixing band 44 for being fixed near the wrist of a forearm, and a holding member 45 through which the fixing band 44 is passed, are provided.

When this portable terminal is worn on the forearm, the display unit 41 is fixed and worn by winding the fixing band 44, passing through the holding member 45 around the wrist of the forearm, and the display screen 42a faces outwardly. The user operates the terminal while watching the display screen 42a.

When watching the display screen 42a, the user has to move the arm on which the terminal is worn so that the screen 42a may be almost perpendicular to a visual axis of the user. If the hand of this arm is being used at this time to perform an operation, the operation must be interrupted. Further, the display screen 42a is not protected from an unexpected external impact.

SUMMARY OF THE INVENTION

A portable terminal has a display screen which can be adjusted to be almost perpendicular to a visual axis of a user without interrupting an operation being performed by the user, and can be protected from an unexpected external impact.

The terminal comprises a display unit having a display screen at a front side, a forearm mounting unit for mounting the display unit on a forearm near a wrist of a user, and a hinge case for rotatably connecting the display unit and forearm mounting unit. The hinge case includes a first rotary mechanism to which the forearm mounting unit is rotatably connected, and a second rotary mechanism to which the display mounting unit is rotatably connected. The first and second rotary mechanisms operate to turn the display screen to a position nearly perpendicular to a visual axis of the user, and to turn the display screen to a position where the screen faces downwardly toward a forearm side.

Thus, the display screen is visible under a condition that the screen is adjusted nearly perpendicular to the visual axis of the user. When not in use, the display screen is faced downwardly, so that the display screen is to be protected from an unexpected external impact.

DESCRIPTION OF THE PREFERRED EMBODIMENTS

An exemplary embodiment of the present invention will be described below while referring to FIG. 1 to FIG. 3.

Figure 1:
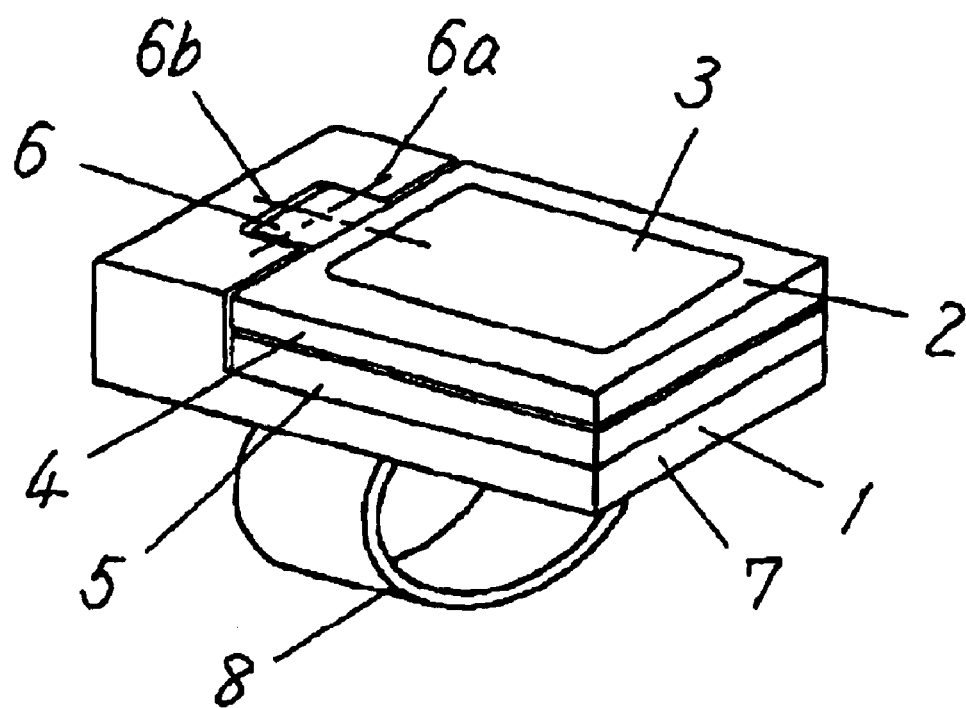
FIG. 1 is a perspective view of a portable terminal wearable on a forearm according to an exemplary embodiment of the present invention.

FIG. 1 is a perspective view of a portable personal computer or a portable terminal, wearable on a forearm according to an exemplary embodiment of the present invention. FIG. 2 is a perspective view showing a state where the terminal is operated with a hand. FIG. 3 is a perspective view showing a state where a display unit is not operated. A display unit 2 of the portable terminal 1 has a display screen 3 composed of a liquid crystal display device and a touch panel, i.e. an input device. The unit 2 further incorporates a circuit board (not shown), a wireless module 61, an antenna 62, and a battery (not shown). A case of the display unit 2 is composed of a front cabinet 4 holding the display screen 3, and a back cabinet 5 made of rigid metal material. Reference numeral 6 denotes a hinge case comprising a first rotary mechanism, having an axis 6a, to which a forearm mounting unit 7 is rotatably connected, and a second rotary mechanism, having an axis 6b, to which the display unit 2 is rotatably connected. The forearm mounting unit 7 has a forearm fixing band 8 for fixing the terminal near a wrist of a forearm of a user.

Figure 2:
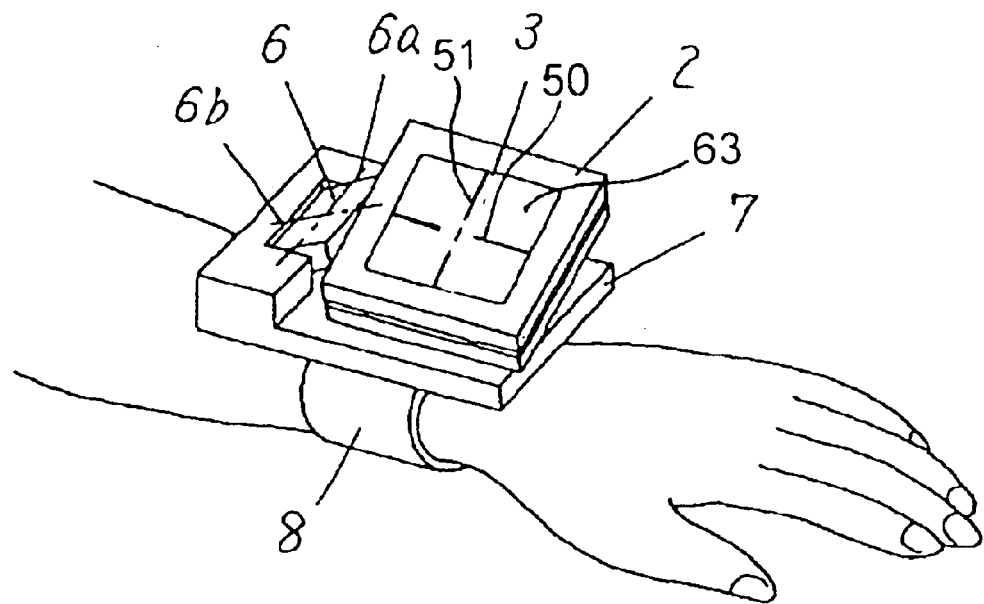
FIG. 2 is a perspective view showing a state where the portable terminal wearable on the forearm according to the embodiment is operated with a hand.

In FIG. 2, the portable terminal 1 is worn near the wrist of the forearm via the forearm fixing band 8 of the forearm mounting unit 7. First, by turning the first rotary mechanism 6a, the user moves the hinge case 6 and display unit 2 to a certain angle with respect to the forearm mounting unit 7, so that an x-axis 50 of the display screen 3 of the display unit 2 may become visible. Then, by turning the second rotary mechanism 6b, the user moves the display unit 2 to a certain angle with respect to the hinge case 6, so that a Y-axis 51 of the display screen 3 may become visible.

As a result, the user can observe the display screen 3 adjusted to be nearly perpendicular relative to a visual axis of the user, and continue to operate the terminal while watching the display screen, without interrupting an operation being performed by the hand of the forearm on which the terminal is mounted. The user can input an operation through the touch panel easily without moving the arm on which the portable terminal 1 is worn.

Figure 3:
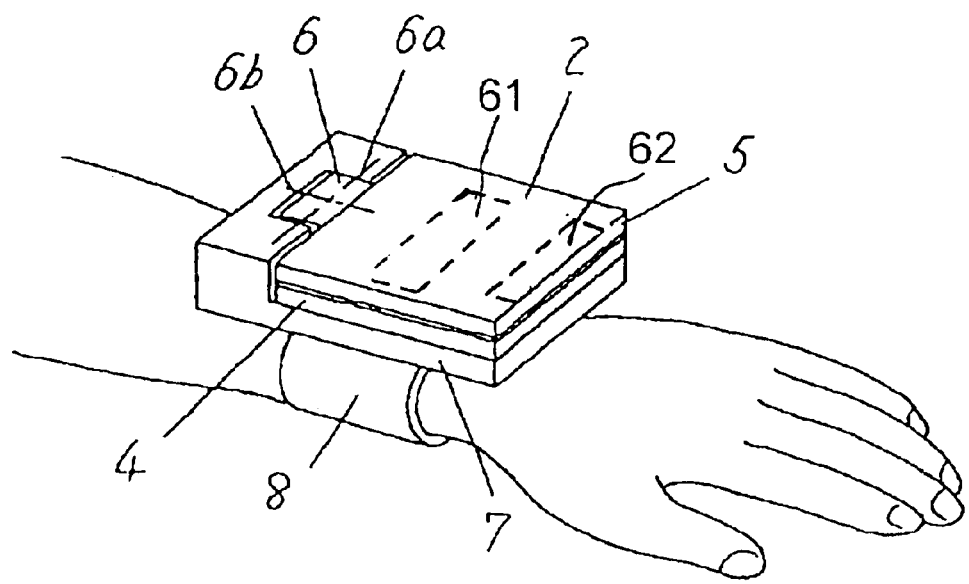
FIG. 3 is a perspective view showing a state where the display unit of the portable terminal wearable on the forearm according to the embodiment is not operated.
Figure 4:
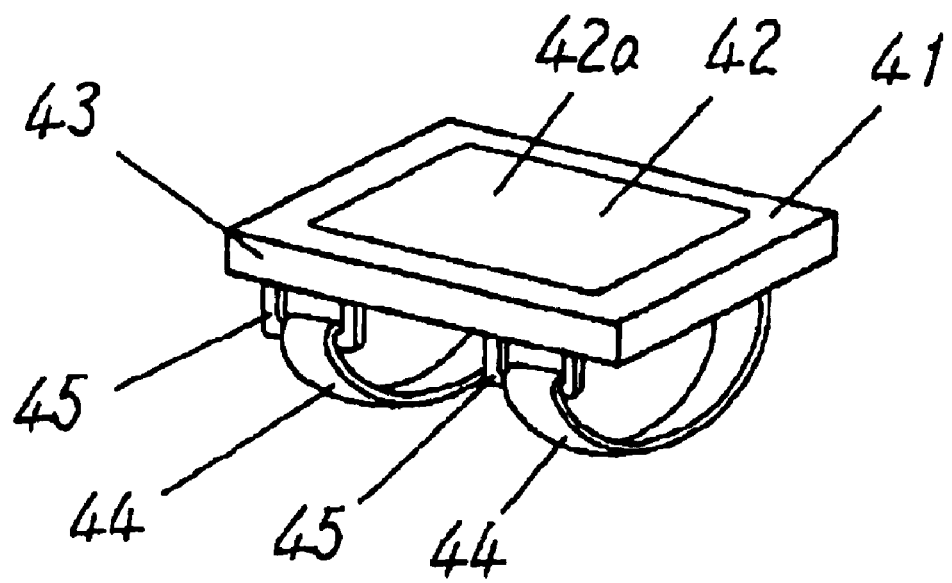
FIG. 4 is a perspective view of a conventional portable terminal wearable on a forearm.

The display unit is not operated in FIG. 3. To position the display unit as shown in FIG. 3, the user initially turns the second rotary mechanism 6b, so that the display screen 3 of the display unit 2 becomes positioned parallel to the hinge case 6, and that the display screen 3 faces the forearm mounting unit 7. Then, the user turns the first rotary mechanism 6a, so that the hinge case 6 and display unit 2 contact the forearm mounting unit 7. At this time, the back cabinet 5 of the display unit 2 faces outwardly.

That is, when the display screen 3 is not operated, the rigid back cabinet 5 of the display unit 2 faces outwardly, so that the display screen 3 and the internal liquid crystal display device can be protected from an unexpected impact.

According to the embodiment, the back cabinet 5 of the display unit 2 is made of rigid metal, but may be made of reinforced resin.

The axis 6a of the first rotary mechanism of the hinge case 6, and the axis 6b of the second rotary mechanism cross each other substantially perpendicularly. Under a condition that a user adjusted the display screen 3 almost perpendicularly to the visual axis of the user about the axis 6b of the second rotary mechanism, the user rotates the display unit about the axis 6a of the first rotary mechanism. Thereby, the visual axis of the user does not drift while the display unit 2 is turned right or left.

Moreover, since a wireless module 61 and antenna 62 are incorporated in the display unit, harness from the display unit 2 to an outside exterior thereof is not necessary and structure of the hinge case is hence simplified. The harness is free from risk of disconnection due to rotation.

Further, the touch panel, as a pen input device 63, which is embedded in the display unit 2 enables an input operation on the display screen 3 only around the forearm, and another input device is not needed.

What is claimed is:

1. A portable terminal comprising:
    a display unit including a display screen;
    a forearm mounting unit for mounting said display unit on a forearm of a user; and
    a hinge case including
        (i) a first rotary mechanism for rotatably coupling said display unit to said forearm mounting unit so as to allow said display unit to rotate relative to said forearm mounting unit about a first axis, and
        (ii) a second rotary mechanism for rotatably coupling said display unit to said forearm mounting unit so as to allow said display unit to rotate relative to said forearm mounting unit for 360° about a second axis that is always parallel to said display screen,
    wherein said hinge case functions as said first rotary mechanism and said second rotary mechanism.

2. The portable terminal according to claim 1, wherein said second rotary mechanism is for rotatably coupling said display unit to said forearm mounting unit such that, when said display unit is mounted on a forearm of a user via said forearm mounting unit, said display screen is rotatable to a position that is substantially perpendicular to a visual axis of the user and to a position at which said display screen faces the forearm of the user.

3. The portable terminal according to claim 1, wherein the first axis and the second axis are substantially orthogonal to each other.

4. The portable terminal according to claim 1, wherein said display unit further includes a protective back case covering a back side of said display screen.

5. The portable terminal according to claim 4, wherein said protective back case comprises at least one of metal and reinforced resin.

6. The portable terminal according to claim 1, wherein said display unit further includes a wireless module and an antenna.

7. The portable terminal according to claim 1, wherein said display unit further includes a pen input device.

8. The portable terminal according to claim 1, wherein
    said forearm mounting unit includes a forearm receiving portion having a first open end and a second open end, and
    said first rotary mechanism is for rotatably coupling said display unit to said forearm mounting unit so as to allow said display unit to rotate relative to said forearm mounting unit about the first axis in a first direction that extends from said first open end toward said second open end.

9. The portable terminal according to claim 8, wherein said second rotary mechanism is for rotatably coupling said display unit to said forearm mounting unit so as to allow said display unit to rotate relative to said forearm mounting unit about the second axis in a second direction that is transverse to the first direction.

10. The portable terminal according to claim 9, wherein said second rotary mechanism is for rotatably coupling said display unit to said forearm mounting unit such that, when said display unit is mounted on a forearm of a user via said forearm mounting unit, said display screen is rotatable to a position that is substantially perpendicular to a visual axis of the user and to a position at which said display screen faces the forearm of the user.

11. The portable terminal according to claim 9, wherein the first axis and the second axis are substantially orthogonal to each other.

12. The portable terminal according to claim 9, wherein said display unit further includes a protective back case covering a back side of said display screen.

13. The portable terminal according to claim 12, wherein said protective back case comprises at least one of metal and reinforced resin.

14. The portable terminal according to claim 9, wherein said display unit further includes a wireless module and an antenna.

15. The portable terminal according to claim 9, wherein said display unit further includes a pen input device.

16. The portable terminal according to claim 8, wherein said second rotary mechanism is for rotatably coupling said display unit to said forearm mounting unit such that, when said display unit is mounted on a forearm of a user via said forearm mounting unit, said display screen is rotatable to a position that is substantially perpendicular to a visual axis of the user and to a position at which said display screen faces the forearm of the user.

17. The portable terminal according to claim 8, wherein the first axis and the second axis are substantially orthogonal to each other.

18. The portable terminal according to claim 8, wherein said display unit further includes a protective back case covering a back side of said display screen.

19. The portable terminal according to claim 18, wherein said protective back case comprises at least one of metal and reinforced resin.

20. The portable terminal according to claim 8, wherein said display unit further includes a wireless module and an antenna.

21. The portable terminal according to claim 8, wherein said display unit further includes a pen input device.

22. The portable terminal according to claim 1, wherein the first axis is sometimes parallel to said display screen.

23. A portable terminal comprising:
    display unit including a display screen;
    a forearm mounting unit for mounting said display unit on a forearm of a user; and
    a hinge case including
        (i) a first rotary mechanism for rotatably coupling said display unit to said forearm mounting unit so as to allow said display unit to rotate relative to said forearm mounting unit about a first axis that is sometimes parallel to said display screen, and
        (ii) a second rotary mechanism for rotatably coupling said display unit to said forearm mounting unit so as to allow said display unit to rotate relative to said forearm mounting unit about a second axis that is always parallel to said display screen, wherein the first axis sometimes is in a plane that is between said display screen and a surface of said display unit opposite to said display screen, and the second axis is in a plane that is between said display screen and a surface of said display unit opposite to said display screen.

24. The portable terminal according to claim 23, wherein said second rotary mechanism is for rotatably coupling said display unit to said forearm mounting unit such that, when said display unit is mounted on a forearm of a user via said forearm mounting unit, said display screen is rotatable to a position that is substantially perpendicular to a visual axis of the user and to a position at which said display screen faces the forearm of the user.

25. The portable terminal according to claim 23, wherein the first axis and the second axis are substantially orthogonal to each other.

26. The portable terminal according to claim 23, wherein
said forearm mounting unit includes a forearm receiving portion having first open end and a second open end, end
said first rotary mechanism is for rotatably coupling said display unit to said forearm mounting unit so as to allow said display unit to rotate relative to said forearm mounting unit about the first axis in a first direction that extends from said first open end toward said second open end.

27. The portable terminal according to claim 26, wherein said second rotary mechanism is for rotatably coupling said display unit to said forearm mounting unit so as to allow said display unit to rotate relative to said forearm mounting unit about the second axis in a second direction that is traverse to the first direction.

28. The portable terminal according to claim 27, wherein said second rotary mechanism is for rotatably coupling said display unit to said forearm mounting unit such that, when said display unit is mounted on a forearm of a user via said forearm mounting unit, said display screen is rotatable to a position that is substantially perpendicular to a visual axis of the user and to a position at which said display screen faces the forearm of the user.

29. The portable terminal according to claim 27, wherein the first axis and the second axis are substantially orthogonal to each other.

30. The portable terminal according to claim 26, wherein said second rotary mechanism is for rotatably coupling said display unit to said forearm mounting unit such that, when said display unit is mounted on a forearm of a user via said forearm mounting unit, said display screen is rotatable to a position that is substantially perpendicular to a visual axis of the user and to a position at which said display screen faces the forearm of the user.

31. The portable terminal according to claim 26, wherein the first axis and the second axis are substantially orthogonal to each other.

32. The portable terminal according to claim 23, wherein said second rotary mechanism is to allow said display unit to rotate relative to said forearm mounting unit about the second axis for 360°.

* * * * *

UNITED STATES PATENT AND TRADEMARK OFFICE
CERTIFICATE OF CORRECTION

PATENT NO. : 6,754,069 B2
DATED : June 22, 2004
INVENTOR(S) : Hideki Harada

It is certified that error appears in the above-identified patent and that said Letters Patent is hereby corrected as shown below:

Column 5,
Line 21, change "end" to -- and --.

Signed and Sealed this

Twenty-eighth Day of December, 2004

JON W. DUDAS
*Director of the United States Patent and Trademark Office*